(12) United States Patent
Selvaraj et al.

(10) Patent No.: US 11,040,616 B2
(45) Date of Patent: Jun. 22, 2021

(54) DUAL FUEL TANK SYSTEM FOR A MACHINE

(71) Applicant: Caterpillar Inc., Deerfield, IL (US)

(72) Inventors: Rajesh Selvaraj, Apex, NC (US); Hugh Rillie, Jr., Cary, NC (US)

(73) Assignee: Caterpillar Inc., Peoria, IL (US)

( * ) Notice: Subject to any disclaimer, the term of this patent is extended or adjusted under 35 U.S.C. 154(b) by 310 days.

(21) Appl. No.: 16/154,203

(22) Filed: Oct. 8, 2018

(65) Prior Publication Data

US 2020/0108714 A1   Apr. 9, 2020

(51) Int. Cl.
*B60K 15/067* (2006.01)
*B60K 15/073* (2006.01)
*F02M 37/00* (2006.01)
*B60K 15/063* (2006.01)
*B60K 15/03* (2006.01)

(52) U.S. Cl.
CPC .......... *B60K 15/067* (2013.01); *B60K 15/073* (2013.01); *F02M 37/007* (2013.01); *F02M 37/0023* (2013.01); *B60K 2015/03144* (2013.01); *B60K 2015/0636* (2013.01); *B60K 2015/0638* (2013.01); *B60Y 2200/221* (2013.01); *B60Y 2200/41* (2013.01)

(58) Field of Classification Search
CPC .......... B60Y 2200/41; B60Y 2200/221; B60Y 2400/85; B60K 2015/0638; B60K 2015/0636; B60K 2015/03144; B60K 15/063; B60K 2015/03217; B60K 2015/03118; B60K 15/03
See application file for complete search history.

(56) References Cited

U.S. PATENT DOCUMENTS

| | | | | |
|---|---|---|---|---|
| 4,149,733 A | * | 4/1979 | Grooss | B60K 15/00 280/834 |
| 4,149,734 A | * | 4/1979 | Sylvester | A01M 7/0085 280/833 |
| 6,550,811 B1 | | 4/2003 | Bennett et al. | |
| 7,641,234 B1 | * | 1/2010 | Pelnar | B60R 21/13 280/756 |
| 8,579,332 B2 | | 11/2013 | Sonderegger et al. | |
| 9,248,736 B2 | * | 2/2016 | Green | B60K 15/063 |
| 9,408,345 B2 | * | 8/2016 | Matsugi | A01D 34/661 |
| 9,469,189 B2 | * | 10/2016 | Minoura | B60K 13/04 |
| 9,931,929 B2 | * | 4/2018 | Green | B60K 15/07 |

(Continued)

FOREIGN PATENT DOCUMENTS

| | | |
|---|---|---|
| EP | 860315 | 12/2001 |
| EP | 2373514 | 3/2017 |
| WO | 2014080714 | 5/2014 |

*Primary Examiner* — Minnah L Seoh
*Assistant Examiner* — Marlon A Arce

(57) ABSTRACT

A dual fuel tank system for a machine having a frame and an engine enclosure mounted on a rear portion of the frame includes a pair of support plates located at the rear portion of the frame and welded onto a pair of sides of the frame. Further, the dual fuel system also includes a pair of upper and lower support brackets secured onto each side of the engine enclosure. Furthermore, the dual fuel system also includes a pair of fuel tanks disposed on the pair of sides of the engine enclosure. Each fuel tank is releasably secured onto the support plate and an associated pair of the upper and lower support brackets.

20 Claims, 4 Drawing Sheets

(56) References Cited

U.S. PATENT DOCUMENTS

2016/0082832 A1\* 3/2016 Dudar .................. G01M 3/025
                                                    206/459.1
2016/0341141 A1\* 11/2016 Dudar ................. G01M 3/3272
2017/0166044 A1    6/2017  Asahara et al.
2017/0225561 A1    8/2017  Komiya
2017/0225622 A1    8/2017  Yoshiki et al.

\* cited by examiner

DUAL FUEL TANK SYSTEM FOR A MACHINE

TECHNICAL FIELD

The present disclosure relates to a fuel tank system of a machine. More particularly, the present disclosure relates to a dual fuel tank system for a compact heavy-duty application machine.

BACKGROUND

It is well known in the art to install a fuel tank on a machine for storing fuel and providing a fuel supply system for supplying fuel from the tank to an engine located onboard the machine. In some cases, a maximum amount of fuel that can be stored by the fuel tank could be insufficient to meet operational requirements of the engine and to power the machine if the machine is required to execute work at a job site that is located remotely from a refuelling station, or if the engine is required to operate for extended hours for providing a prolonged period of uninterrupted power to the machine at the job site.

U.S. Pat. No. 6,550,811 (hereinafter referred to as "the '811 patent") discloses a side mount fuel tank system that could be installed on an earth moving vehicle such as a motor grader. Although the '811 patent provides the side mount fuel tank, the fuel tank of the '811 patent is configured to meet operational requirements of the motor grader which is typically used in light duty applications such as grading soil where it is assumed that the amount of fuel stored by the side mount fuel tank system would be adequate to meet the operational requirements of the motor grader.

However, on the contrary, operating conditions experienced by a heavy-duty machine could be different from that typically experienced by a light-duty application machine such as the motor grader. One of many examples of a compact yet heavy-duty application machine may include a tractor. Owing to a typically compact frame size, it has been observed that conventional fuel tank systems that are designed for a tractor have less than adequate sizing for storing sufficient amount of fuel and meeting the operational requirements of the tractor.

With the foregoing in mind, it would be prudent to provide a fuel supply system having a fuel tank that is large enough to store sufficient amount of fuel for meeting operational requirements of a heavy-duty application machine such as the tractor, and hence, facilitating the tractor to complete work required at a job site.

SUMMARY OF THE DISCLOSURE

In an aspect of the present disclosure, a dual fuel tank system for a machine having a frame and an engine enclosure mounted on a rear portion of the frame includes a pair of support plates located at the rear portion of the frame and welded onto a pair of sides of the frame. Further, the dual fuel system also includes a pair of upper and lower support brackets secured onto each side of the engine enclosure. Furthermore, the dual fuel system also includes a pair of fuel tanks disposed on the pair of sides of the engine enclosure. Each fuel tank is releasably secured onto the support plate and an associated pair of the upper and lower support brackets.

In another aspect of this disclosure, a machine includes a frame and an engine enclosure supported on a rear portion of the frame. The machine also includes a pair of support plates located at the rear portion of the frame and welded onto a pair of sides of the frame. Further, the machine also includes a pair of upper and lower support brackets secured onto each side of the engine enclosure. Furthermore, the machine also includes a pair of fuel tanks disposed on the pair of sides of the engine enclosure. Each fuel tank is releasably secured onto the support plate and an associated pair of the upper and lower support brackets.

Other features and aspects of this disclosure will be apparent from the following description and the accompanying drawings.

DETAILED DESCRIPTION

Figure 1:
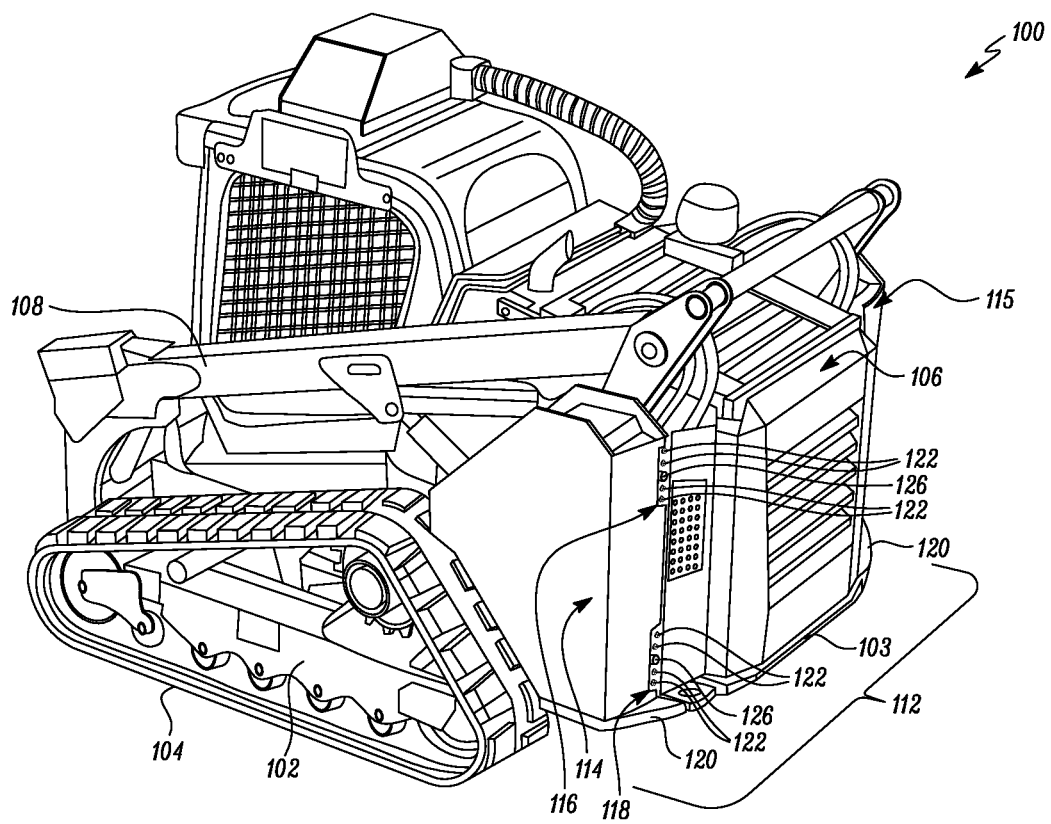
FIG. 1 is a side perspective view of a machine having a dual fuel tank system, in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

Figure 2:
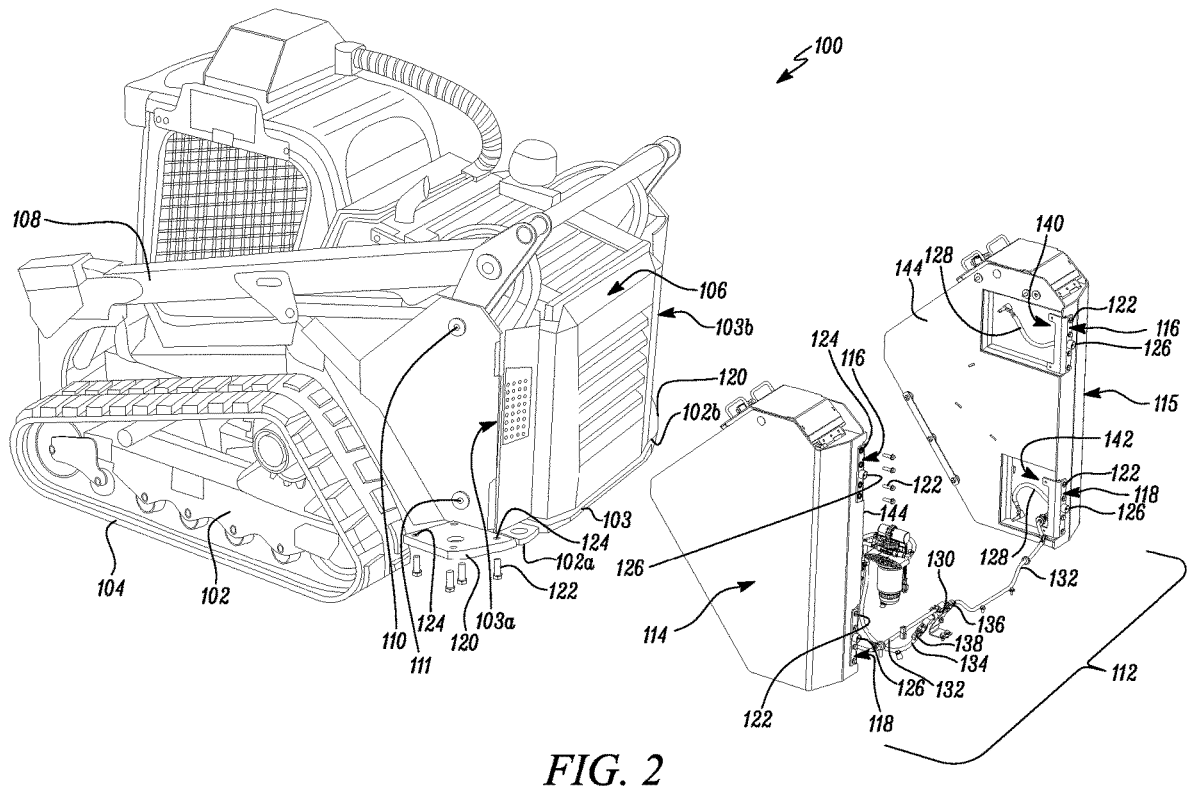
FIG. 2 is a partially exploded side perspective view of the machine showing a pair of support plates and a pair of support brackets for mounting the dual fuel tank system thereon, in accordance with an embodiment of the present disclosure.

FIGS. 1 and 2 illustrate a machine 100. As shown, the machine 100 is embodied in the form of a compact tractor. The tractor disclosed herein is configured for use in applications such as, but not limited to, agriculture, forestry and other applications where tight spaces may be encountered during operation. As shown, the machine 100 has a frame 102 having ground engaging members 104, for example, tracks rotatably supported thereon. The machine 100 also has an engine enclosure 106 that is supported on a rear portion 103 of the frame 102. The engine enclosure 106 may be configured to enclose an engine (not shown) and other components that are typically associated as part of a drive system with the engine.

Further, the machine 100 also includes a pair of support plates 120 that are located at the rear portion 103 of the frame 102 and welded onto a pair of sides 102a, 102b of the frame 102. These support plates 120 may be co-planar with the frame 102 as shown, or alternatively, disposed at a pre-determined angle to the frame 102.

Furthermore, the machine 100 also includes a pair of upper and lower support brackets 116, 118 secured onto each side 106a, 106b of the engine enclosure 106. The machine 100 also includes a dual fuel tank system 112 having a pair of fuel tanks 114, 115 that are disposed on the pair of sides 106a, 106b of the engine enclosure 106. As shown, each fuel tank 114, 115 is releasably secured onto the support plate 120 and an associated pair of the upper and lower support brackets 116, 118.

Further, the machine 100 also has means for fastening an associated fuel tank 114, 115 to each of the upper and lower support brackets 116, 118 and the support plate 120. These means for fastening an associated fuel tank 114, 115 to each of the upper and lower support brackets 116, 118 and the support plate 120 may include fasteners 122 that are configured to threadably engage with holes 124 on each of the upper and lower support brackets 116, 118 and the support plate 120 respectively. Each of these fasteners 122 may include, for example, a HEX bolt as shown, an Allen screw, a stud, or any other type of fastener known to persons skilled in the art.

Figure 3:
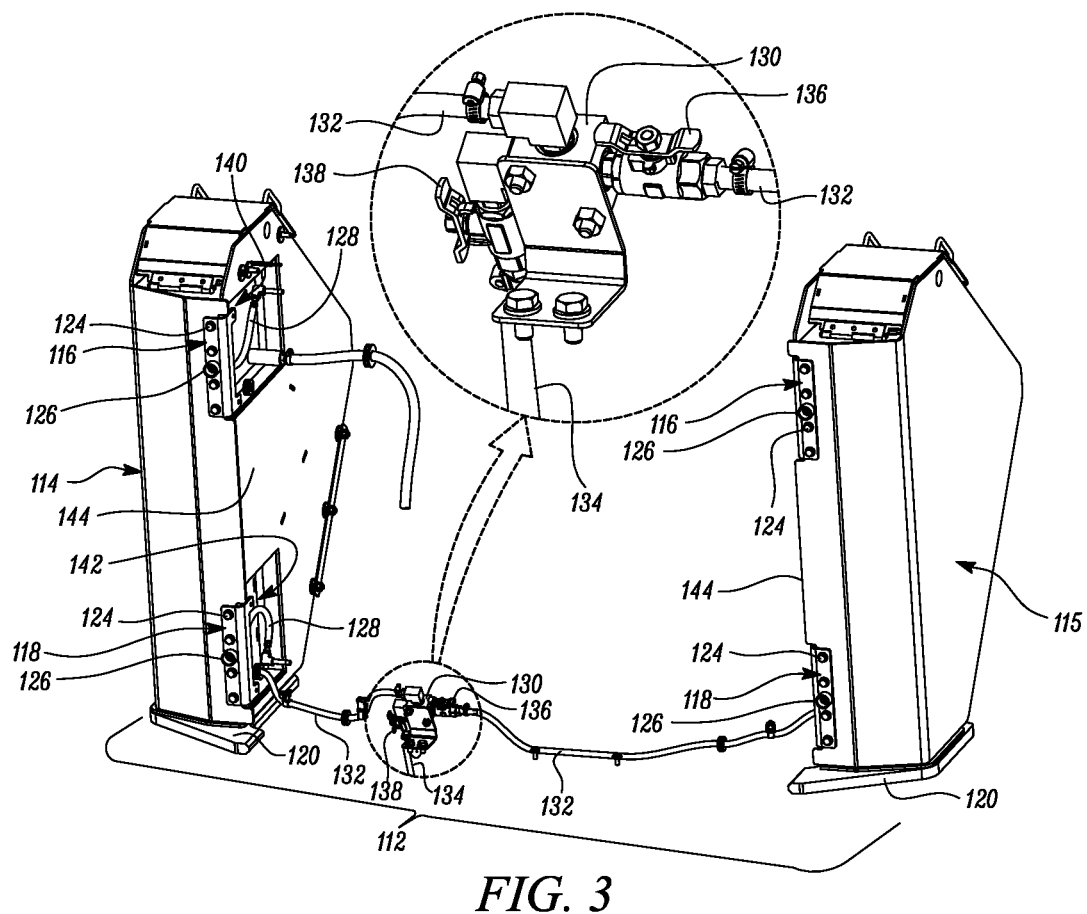
FIG. 3 is a rear perspective view of the dual fuel tank system, in accordance with an embodiment of the present disclosure.

Referring to FIGS. 1 and 2, and as best shown in the view of FIG. 3, each tank 114, 115 has a wall 144 located proximal to the engine enclosure 106. This wall 144 has a pair of recesses i.e., a first recess 140 and a second recess 142. The first recess 140 is configured to correspond with a first hinge pin 110 located at a first height above the frame 102 and the second recess 142 configured to correspond with a second hinge pin 111 located at a second height above the frame 102, the second height being lower than the first height as shown in the illustrated embodiment of FIG. 2.

Each of the first and second recesses 140, 142 is structured to receive a lubrication conduit 128 therein. Further, each upper and lower support bracket 116, 118 includes a receptacle 126 for supporting an end of the lubrication conduit 128 therein. Furthermore, as shown in FIGS. 1 and 2, the machine 100 has at least one linkage member 108 that is configured to support a work implement (not shown) disposed at a fore portion of the machine 100. The machine 100 also has a hinge pin, for instance the first hinge pin 110 that is associated with the linkage member 108. Another hinge pin 111, that is visible in the view of FIG. 2, may be positioned to correspond and couple with another linkage member (not shown) of the machine 100. The lubrication conduit 128, whose end is supported by the receptacle 126 of the support bracket 116, is disposed within the first recess 140 and would be coupled to a port of the first hinge pin 110 associated with the linkage member 108. Similarly, the lubrication conduit 128, whose end is supported by the receptacle 126 of the support bracket 118, is disposed within the second recess 142 and would be coupled to a port of the second hinge pin 111 associated with the other linkage member of the machine 100.

Referring to FIG. 2 and as best shown in the view of FIG. 3, the dual fuel tank system 112 also includes a fuel supply manifold 130 that disposed between the pair of fuel tanks 114, 115 and fluidly coupled to each of the fuel tanks 114, 115 via a first supply line 132. A first fuel shut-off valve 136 is coupled to the first supply line 132 that is associated with one of the fuel tanks, for instance the fuel tank 115 as shown in the illustrated embodiments of FIGS. 2 and 3. The first fuel shut-off valve 136 is operable to selectively allow a flow of fuel from the fuel tank 115 to the fuel supply manifold 130. Although the first fuel shut-off valve 136 is shown associated with the fuel supply line 132 of the fuel tank 115, in other embodiments, another fuel shut-off valve, similar to the first fuel shut-off valve 136, may be additionally, or optionally, provided to the first supply line 132 that is connected with the fuel tank 114. Further, a second supply line 134 is coupled to an outlet of the fuel supply manifold 130. The second supply line 134 has a second fuel shut-off valve 138 disposed therein for selectively controlling delivery of fuel from the fuel supply manifold 130 to the engine.

Figure 4:
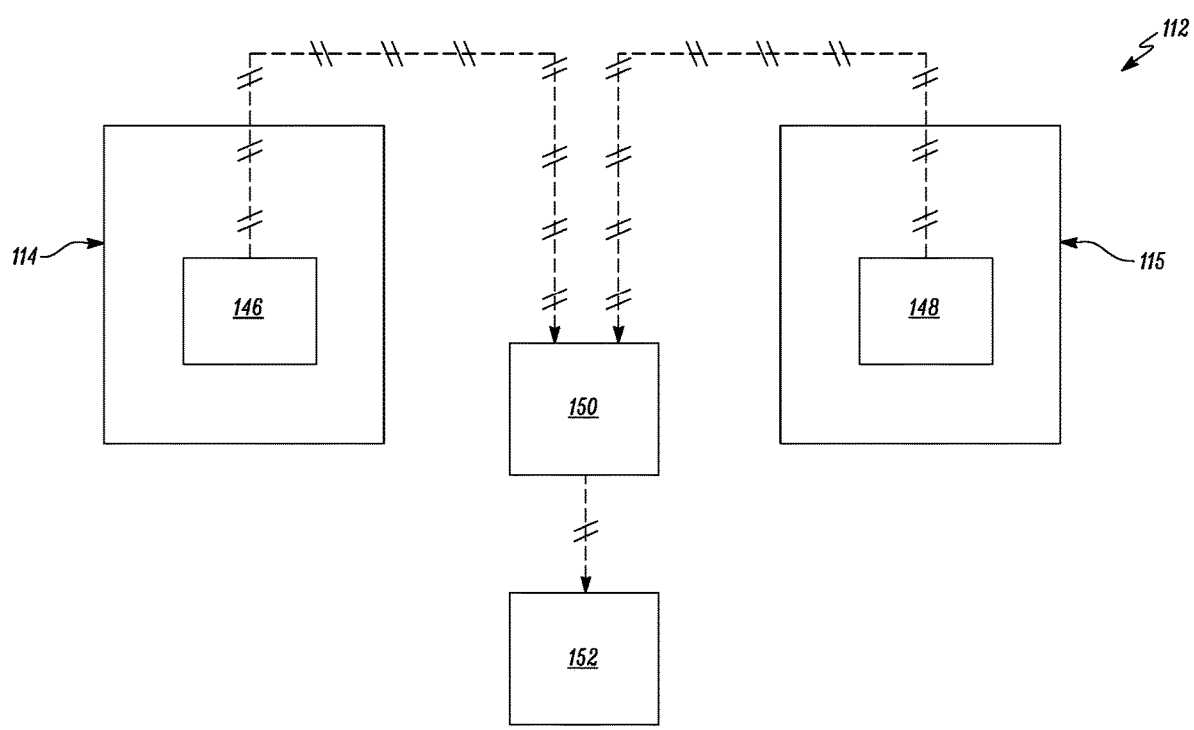
FIG. 4 is a schematic representation of a pair of fuel level sensors, a controller, and a display device that form part of the dual fuel tank system, in accordance with an embodiment of the present disclosure.

In an embodiment, the dual fuel tank system 112 includes a fuel level sensor 146 that is disposed within one of the fuel tanks, for instance the fuel tank 114 as shown schematically in the view of FIG. 4. This fuel level sensor 146 would be configured to provide a signal indicative of a level of fuel present within the fuel tank 114 to a controller 150 that is communicably coupled to the fuel level sensor 146. The controller 150 is configured to receive the signal from the fuel level sensor 146, determine a level of fuel in the fuel tank 114, and deliver a signal indicative of the level of fuel to a display device 152 that is disposed in communication with the controller 150.

It is hereby envisioned that, during operation of the machine 100, when the first fuel shut-off valve 136 is open to fluidly connect with the fuel tank 115 with the fuel supply manifold 130, the fuel supply lines 132 associated with respective ones of the fuel tanks 114, 115 act as a balancing line for equalizing a level of fuel present in each of the fuel tanks 114 and 115. In this manner, the signal output by the first fuel level sensor 146 to the controller 150 would be adequate for the controller 150 in determining a total level of fuel present in the fuel tanks 114 and 115.

However, in an alternative embodiment, the dual fuel tank system may additionally include an other fuel level sensor 148 disposed within an other one of the fuel tanks, for instance, the fuel tank 115 as shown in FIG. 5. The other fuel level sensor 148 would be configured to provide a signal indicative of a level of fuel present within the other one of the fuel tanks 115. The controller 150 would be disposed in communication with each of the fuel level sensor 146 and the other fuel level sensor 148 respectively. In this alternative embodiment, the controller 150 would be configured to receive a signal from each of the fuel level sensor 146 and the other fuel level sensor 148, determine a level of fuel in each fuel tank 114 and 115 independently of each other, and thereby determine a total level of fuel in both fuel tanks 114 and 115 by computing a sum of the fuel present in both the fuel tank 114 and 115. The controller 150 would then deliver a signal indicative of the determined total level of fuel present in both the tanks 114 and 115 to the display device 152.

It will be appreciated that in embodiments of the present disclosure, the controller 150 would include a read-only memory (ROM), a random-access memory (RAM), suitable circuitry, control logic, and other hardware and software components that are configured to perform functions consistent with the present disclosure. The display device 152 that is disposed in communication with the controller 150 may embody, for example, a dial gauge or a graphical user interface (GUI) that is capable of displaying fuel data thereon.

Various embodiments disclosed herein are to be taken in the illustrative and explanatory sense, and should in no way be construed as limiting of the present disclosure. All joinder references (e.g., associated, provided, connected, coupled and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to or over another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

With implementation of the embodiments disclosed herein, manufacturers can provide support to each of the fuel tanks 114 and 115 easily using commonly known processes such as welding the pair of support plates 120 onto sides 102a and 102b of the frame 102 respectively. Subsequently, using the fastening means can help secure the tanks 114, 115 onto each of the upper and lower support brackets 116, 118 that are located on each side 106a, 106b of the engine enclosure 106.

The present disclosure has applicability for use and implementation in providing a dual fuel tank system to a compact heavy-duty application machine. With use of embodiments herein, manufacturers of machines such as tractors can provide the dual fuel tank system 112 of the present disclosure so that operators of machines can store sufficient volume of fuel for facilitating the machine to be used for extended periods of time without the need for frequent refueling. Providing the dual fuel tank system 112 of the present disclosure may, therefore, prolong an operating cycle of the machine with an uninterrupted supply of fuel, and hence, help achieve an increased amount of productivity from the machine entailed due to a less frequent refuelling of fuel. Also, embodiments herein can help operators deploy such machines at job sites that may be remotely located from a refueling station while mitigating risks associated with the machine running out of fuel during operation.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A dual fuel tank system for a machine having a frame and an engine enclosure mounted on a rear portion of the frame, the frame and the engine enclosure each including opposite sides, the dual fuel tank system comprising:
 a pair of support plates, each support plate being configured to be located at the rear portion of the frame and secured to one of the sides of the frame;
 a pair of upper and lower support brackets configured to be secured onto each side of the engine enclosure; and
 a pair of fuel tanks configured to be disposed on the pair of sides of the engine enclosure, each fuel tank being releasably secured onto the support plate and an associated pair of the upper and lower support brackets, each fuel tank being releasably secured to its associated support plates and its associated pair of upper and lower support plate with a plurality of fasteners.

2. The dual fuel tank system of claim 1 further comprising a fuel supply manifold disposed between the pair of fuel tanks and fluidly coupled to each of the fuel tanks via a first supply line.

3. The dual fuel tank system of claim 2 further comprising a first fuel shut-off valve coupled to the first supply line, the first fuel shut-off valve being associated with one of the fuel tanks.

4. The dual fuel tank system of claim 3 further comprising a second supply line coupled to an outlet of the fuel supply manifold, the second supply line having a second fuel shut-off valve disposed therein for selectively controlling delivery of fuel from the fuel supply manifold.

5. The dual fuel tank system of claim 1 further comprising:
 a fuel level sensor disposed within one of the fuel tanks, the fuel level sensor configured to provide a signal indicative of a level of fuel present within the fuel tank; and
 a controller communicably coupled to the fuel level sensor, the controller configured to receive the signal from the fuel level sensor, determine a level of fuel in the fuel tank, and deliver a signal indicative of the level of fuel to a display device that is disposed in communication with the controller.

6. The dual fuel tank system of claim 5 further comprising:
 a second fuel level sensor disposed within a second one of the fuel tanks, the fuel level sensor configured to provide a signal indicative of a level of fuel present within the second one of the fuel tanks, and wherein the controller is disposed in communication with each of the fuel level sensor and the second fuel level sensor, the controller configured to receive a signal from each of the fuel level sensor and the second fuel level sensor, determine at least one of a level of fuel in each fuel tank and a total level of fuel in both fuel tanks, and deliver a signal indicative of the determined level of fuel to the display device.

7. The dual fuel tank system of claim 1 wherein each fuel tank is secured to its associated support plate with a first plurality of fasteners and is secured to its associated pair of upper and lower support plates with a second plurality of fasteners, each of the first plurality of fasteners having a first longitudinal axis and each of the second plurality of fasteners having a second longitudinal axis, the first longitudinal axes being at an angle to the second longitudinal axes.

8. A dual fuel tank system for a machine having a frame and an engine enclosure mounted on a rear portion of the frame, the frame including opposite sides, the dual fuel tank system comprising:
 a pair of support plates, each support plate being configured to be located at the rear portion of the frame and secured to one of the sides of the frame;
 a pair of upper and lower support brackets configured to be secured onto each side of the engine enclosure; and
 a pair of fuel tanks configured to be disposed on the pair of sides of the engine enclosure, each fuel tank being releasably secured onto the support plate and an associated pair of the upper and lower support brackets, wherein each fuel tank has a wall configured to be located proximal to the engine enclosure, the wall having a pair of recesses structured to receive a lubrication conduit therein.

9. The dual fuel tank system of claim 8, wherein each tank has:
- a first recess configured to correspond with a first hinge pin located at a first height above the frame; and
- a second recess configured to correspond with a second hinge pin located at a second height above the frame, the second height being lower than the first height.

10. The dual fuel tank system of claim 8, wherein each upper and lower support bracket includes a receptacle for supporting an end of the lubrication conduit therein.

11. A machine comprising:
- a frame including opposite sides;
- an engine enclosure supported on a rear portion of the frame, the engine enclosure including opposite sides;
- a pair of support plates, each support plate being located at the rear portion of the frame and secured to one of the sides of the frame;
- a pair of upper and lower support brackets secured onto each side of the engine enclosure; and
- a pair of fuel tanks disposed on the pair of sides of the engine enclosure, each fuel tank being releasably secured onto the support plate and an associated pair of the upper and lower support brackets, each fuel tank being releasably secured to its associated support plates and its associated pair of upper and lower support plate with a plurality of fasteners.

12. The machine of claim 11 further comprising:
- a fuel supply manifold disposed between the pair of fuel tanks and fluidly coupled to each of the fuel tanks via a first supply line; and
- a first fuel shut-off valve coupled to the first supply line, the first fuel shut-off valve associated with one of the fuel tanks.

13. The machine of claim 12 further comprising a second supply line coupled to an outlet of the fuel supply manifold, the second supply line having a second fuel shut-off valve disposed therein for selectively controlling a delivery of fuel from the fuel supply manifold.

14. The machine of claim 11 further comprising:
- a fuel level sensor disposed within one of the fuel tanks, the fuel level sensor configured to provide a signal indicative of a level of fuel present within the fuel tank; and
- a controller communicably coupled to the fuel level sensor, the controller configured to receive the signal from the fuel level sensor, determine a level of fuel in the fuel tank, and deliver a signal indicative of the level of fuel to a display device that is disposed in communication with the controller.

15. The machine of claim 14 further comprising:
- a second fuel level sensor disposed within a second one of the fuel tanks, the fuel level sensor configured to provide a signal indicative of a level of fuel present within the second one of the fuel tanks, and wherein the controller is disposed in communication with each of the fuel level sensor and the second fuel level sensor, the controller configured to receive a signal from each of the fuel level sensor and the second fuel level sensor, determine at least one of a level of fuel in each fuel tank and a total level of fuel in both fuel tanks, and deliver a signal indicative of the determined level of fuel to the display device.

16. A machine comprising:
- a frame including opposite sides;
- an engine enclosure supported on a rear portion of the frame, the engine enclosure including opposite sides;
- a pair of support plates, each support plate being located at the rear portion of the frame and secured to one of the sides of the frame;
- a pair of upper and lower support brackets secured onto each side of the engine enclosure;
- a pair of fuel tanks disposed on the pair of sides of the engine enclosure, each fuel tank being releasably secured onto the support plate and an associated pair of the upper and lower support brackets; and
- wherein each fuel tank has a wall located proximal to the engine enclosure, the wall having at least one recess structured to receive a lubrication conduit therein.

17. The machine of claim 16, wherein each tank has:
- a first recess configured to correspond with a first hinge pin located at a first height above the frame; and
- a second recess configured to correspond with a second hinge pin located at a second height above the frame, the second height being lower than the first height.

18. The machine of claim 16, wherein each upper and lower support bracket includes a receptacle for supporting an end of the lubrication conduit therein.

19. The machine of claim 16 further comprising a linkage member and a hinge pin associated with the linkage member.

20. The machine of claim 19, wherein the lubrication conduit is coupled to a port of the hinge pin associated with the linkage member.

* * * * *